US006923356B2

(12) United States Patent
Reynolds (10) Patent No.: US 6,923,356 B2
(45) Date of Patent: Aug. 2, 2005

(54) METHOD AND APPARATUS FOR RETAINING BAGS

(76) Inventor: Michael Reynolds, 1600 Oakshire, Berkley, MI (US) 48072

( * ) Notice: Subject to any disclaimer, the term of this patent is extended or adjusted under 35 U.S.C. 154(b) by 153 days.

(21) Appl. No.: 10/226,060

(22) Filed: Aug. 22, 2002

(65) Prior Publication Data

US 2004/0035899 A1 Feb. 26, 2004

(51) Int. Cl.[7] .............................................. A45C 15/00
(52) U.S. Cl. ..................... 224/585; 224/254; 224/258; 224/268; 224/275; 224/604; 224/925; 248/100; 294/143; 294/159
(58) Field of Search ................................ 224/582, 585, 224/600, 603, 604, 605, 275, 621, 254, 258, 268, 682, 684, 925; 248/100; 294/141, 143, 159, 160, 170

(56) References Cited

U.S. PATENT DOCUMENTS

| | | | |
|---|---|---|---|
| 279,706 A | | 6/1883 | Carroll |
| 741,098 A | | 10/1903 | Bibler |
| 910,238 A | | 1/1909 | Shaw |
| 1,185,698 A | | 6/1916 | Miller |
| 1,879,480 A | | 9/1932 | Pures |
| 2,791,255 A | | 5/1957 | Ogden |
| 3,302,837 A | | 2/1967 | Montgomery |
| 3,388,886 A | | 6/1968 | Tucker |
| 3,458,188 A | * | 7/1969 | Infante ...................... 472/133 |
| 3,465,930 A | | 9/1969 | Croix |
| 3,602,409 A | * | 8/1971 | Kerns ......................... 224/258 |
| 3,828,994 A | | 8/1974 | Hollins |
| 3,986,649 A | | 10/1976 | Heimstra |
| 4,165,828 A | | 8/1979 | Lewis |
| 4,226,348 A | | 10/1980 | Dottor et al. |
| 4,305,519 A | | 12/1981 | Gerich |
| 4,432,121 A | | 2/1984 | Dupre |
| 4,466,659 A | | 8/1984 | Carpentier et al. |
| 4,556,245 A | | 12/1985 | Gruenwald |
| 4,657,295 A | | 4/1987 | Holem |
| 4,684,087 A | | 8/1987 | Spickard |
| 4,757,928 A | | 7/1988 | Browne |
| 4,946,065 A | | 8/1990 | Goulter et al. |
| 4,946,120 A | | 8/1990 | Hatcher |
| 5,044,321 A | | 9/1991 | Selph |
| 5,050,825 A | | 9/1991 | Bratset |

(Continued)

FOREIGN PATENT DOCUMENTS

WO      WO 95/01112       1/1995

*Primary Examiner*—Stephen K. Cronin
(74) *Attorney, Agent, or Firm*—Harness, Dickey & Pierce, P.L.C.

(57) ABSTRACT

An apparatus and method are provided for retaining bags. The apparatus for retaining bags utilizes at least one fastener attached to a shock absorption system. The shock absorption system is coupled to a handle and a strap, such that the apparatus for retaining bags can be transported by either of the handle or strap and the strap is adaptable to fit around an automobile seat. The method for retaining bags includes securing bags to a fastener, adjusting the strap to fit a shoulder, transporting the apparatus to a vehicle, and adapting the strap to fit to the automobile seat.

31 Claims, 11 Drawing Sheets

U.S. PATENT DOCUMENTS

| | | | |
|---|---|---|---|
| 5,058,790 A | 10/1991 | LaVelle | |
| 5,129,612 A | 7/1992 | Beaupre | |
| 5,181,757 A | 1/1993 | Montoya | |
| 5,246,154 A * | 9/1993 | Adams et al. | 224/257 |
| 5,266,526 A | 11/1993 | Aoyama et al. | |
| 5,287,971 A | 2/1994 | Dorman | |
| 5,361,956 A | 11/1994 | Recanati | |
| 5,366,189 A | 11/1994 | Thompson | |
| 5,370,286 A * | 12/1994 | Newman | 224/578 |
| 5,415,457 A | 5/1995 | Kifer | |
| 5,425,485 A * | 6/1995 | Carlo | 224/258 |
| 5,427,288 A | 6/1995 | Trubee | |
| D362,621 S | 9/1995 | Blocker | |
| D362,622 S | 9/1995 | Van Davelaar | |
| 5,458,301 A | 10/1995 | Cournoyer | |
| 5,492,257 A | 2/1996 | Demick | |
| 5,507,542 A | 4/1996 | Eden | |
| D371,023 S | 6/1996 | Higgins | |
| 5,527,076 A | 6/1996 | Randels | |
| 5,599,052 A | 2/1997 | Van Davelaar | |
| 5,687,893 A | 11/1997 | Jacobsmeyer, Jr. | |
| 5,698,858 A | 12/1997 | Borner | |
| 5,806,732 A * | 9/1998 | Hensley | 224/258 |
| 5,836,634 A * | 11/1998 | Finkelman | 294/159 |
| 6,550,653 B2 * | 4/2003 | Matthews | 224/250 |
| 6,651,941 B1 * | 11/2003 | Kinsel | 248/100 |

* cited by examiner

METHOD AND APPARATUS FOR RETAINING BAGS

FIELD OF THE INVENTION

The present invention relates generally to an apparatus for retaining bags. In particular, the present invention relates to an apparatus for retaining bags having multiple fasteners and a shock absorption system configured to stabilize the bags during transport.

BACKGROUND OF THE INVENTION

From grocery bags to luggage, man has carried bags for centuries. Today, a common sight on the streets of a major city is a lone person struggling to carry multiple bags from the grocery store. Inevitably the person has their hands completely full and must set packages down in order to perform simple tasks such as opening doors, paying for a taxi or getting keys out of their pockets. In other situations, a person has the bags in a grocery cart and loads the cargo into their automobile, and finds upon reaching their destination that the bags have moved during transport, emptying their contents.

An apparatus for retaining bags typically comprises a hook and a strap. The hook is designed to support the bags and the strap for carrying the apparatus on a shoulder. Another common apparatus for carrying bags includes a plurality of hooks instead of just one and a rigid handle. These apparatuses enable transporting of the bags, however, they tend to be cumbersome and unappealing to the consumer. In addition, none of these apparatuses are adaptable to be used to secure the bags in a vehicle cargo area. Hence, the user must first put the bags onto the apparatus, and then take them off when they reach the vehicle to place them into the vehicle's cargo area. This is a time consuming process that makes the use of the apparatus inefficient.

Accordingly, a need exists for an apparatus for retaining bags that is not an inconvenience or unappealing and is easily adaptable to be used in conjunction with an automobile cargo area.

SUMMARY OF THE INVENTION

The present invention provides an apparatus for retaining bags. The apparatus for retaining bags employs a retaining mechanism to hold the handles of the bags. The retaining mechanism includes at least one fastener for securing the bags and a shock absorption system to distribute the weight of the bags and insulate the holder from jolts to the bags during transport. In addition, the apparatus for retaining bags has both a strap and a handle for transporting the bags, and the strap can be lengthened to fit around a seat in an automobile without having to remove the bags. With the strap adaptable to fit over an automobile seat, the user can walk easily transport the goods from store to home without ever having to remove the bags once they are secured or having to worry about the bags spilling in the vehicle during transport.

Further, the present invention provides a method for retaining bags including attaching at least one bag to a fastener on a retaining mechanism. A strap coupled to the retaining mechanism is then adjusted to fit around a shoulder. The bags are then transported on the retaining mechanism to a vehicle where the strap is unbuckled to attach the strap and retaining mechanism with bags around a vehicle seat.

The present invention also has an ornamental design which is pleasing to consumers. The various ornamental configurations allow the consumer to choose an apparatus for retaining bags of the present invention that most suits their sense of style and personality. Further, the present invention has an area for personalization or advertising. Hence, the present invention is appealing to both the small consumer and major retailers for use to retaining their bags.

Further areas of applicability of the present invention will become apparent from the detailed description provided hereinafter. It should be understood that the detailed description and specific examples, while indicating the embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments are merely exemplary in nature and are in no way intended to limit the invention, its application, or uses.

Figure 1:
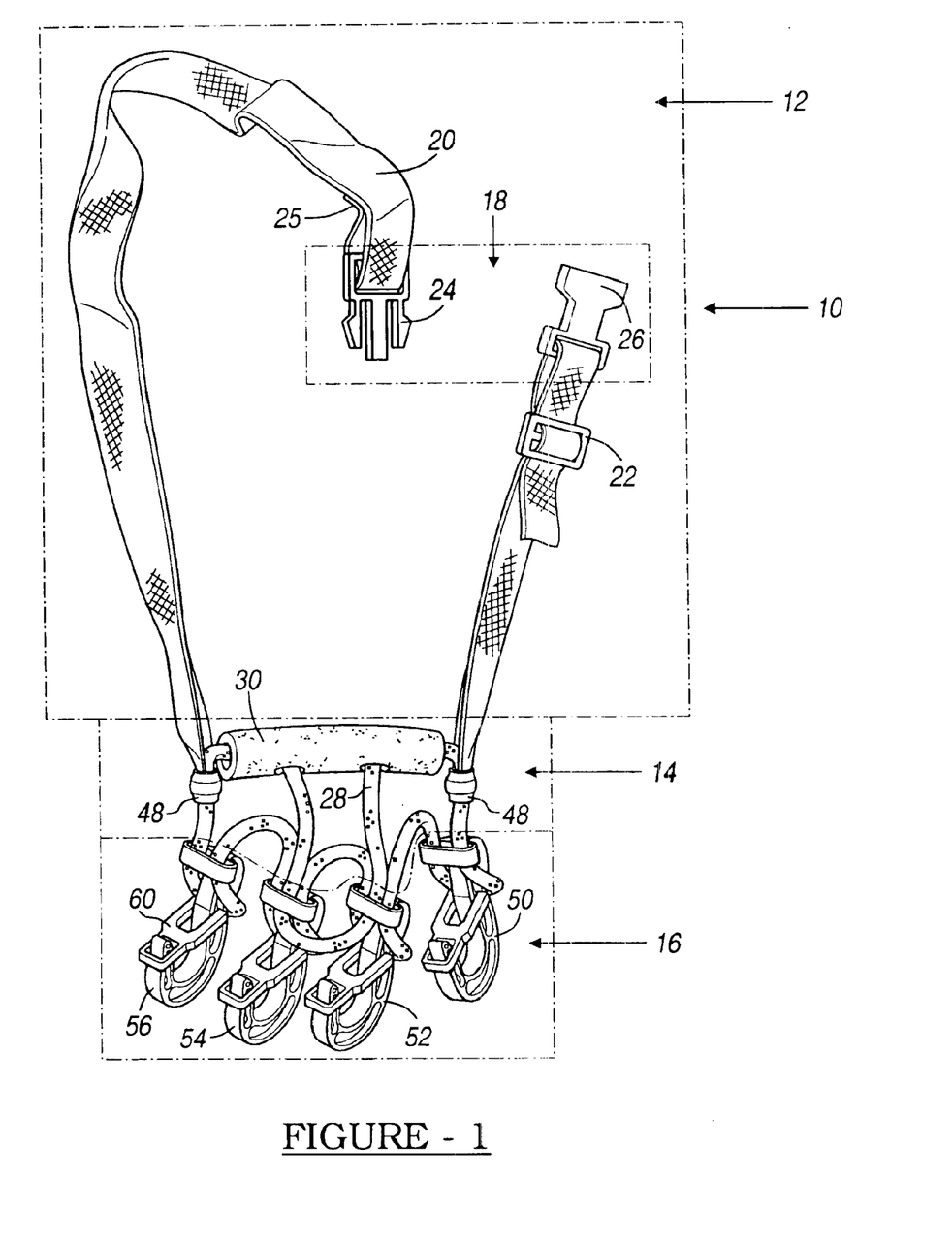
FIG. 1 is a perspective view of an apparatus for retaining bags according to the principles of the present invention.
Figure 2:
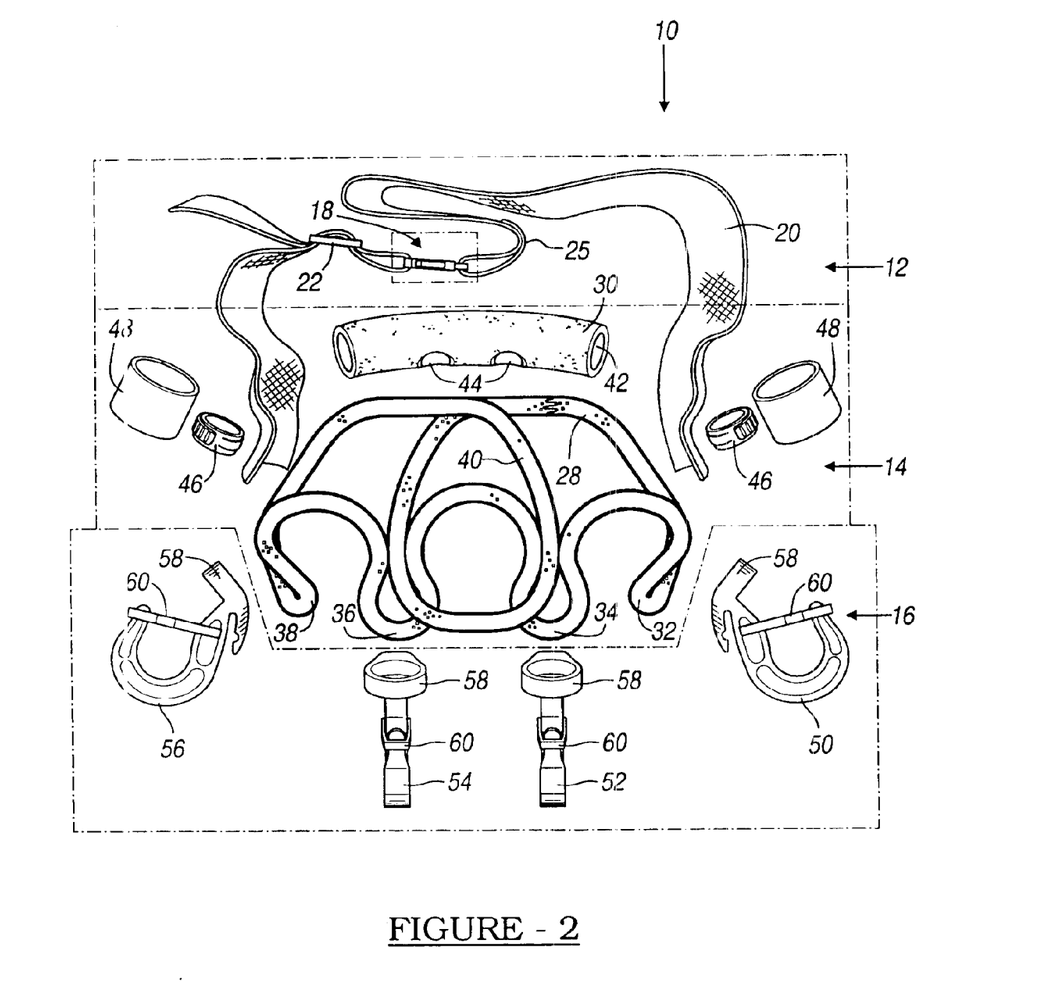
FIG. 2 is an exploded view of the first embodiment of the present invention.

Referring generally to FIGS. 1 and 2, a perspective view of a first embodiment of an apparatus 10 for retaining bags is shown. The apparatus 10 for retaining bags has a support system 12 coupled to a shock absorption system 14. The shock absorption system 14 is further coupled to a retainer system 16.

The support system 12 of the apparatus 10 for retaining bags includes a buckle assembly 18 coupled to a strap 20 with an adjustment loop 22. Buckle assembly 18 includes a mating fork 24 held on the strap 20 by a stitched loop 25. The buckle assembly 18 further includes a fork receiving slot 26 removably coupled to the strap 20. The buckle assembly 18 is available through National Molding of Farmingdale, N.Y. By releasing or engaging the mating fork 24 and fork receiving slot 26, the strap 20 forms either an open loop or a closed loop respectively, enabling the strap 20 to be easily placed around objects, such as, for example, automobile seats or shoulders. The adjustment loop 22 on strap 20 allows strap 20 to be lengthened or shortened based upon the distance of the adjustment loop 22 from the fork receiving slot 26. The greater the distance from the fork receiving slot 26, the larger amount of material in the adjustment loop 22, which results in a shorter strap 20. In this embodiment, strap 20 is made from nylon. The strap 20 is designed such that it enables the placement of an advertisement thereon. Strap 20, is further coupled to the shock absorption system 14.

Figure 8:
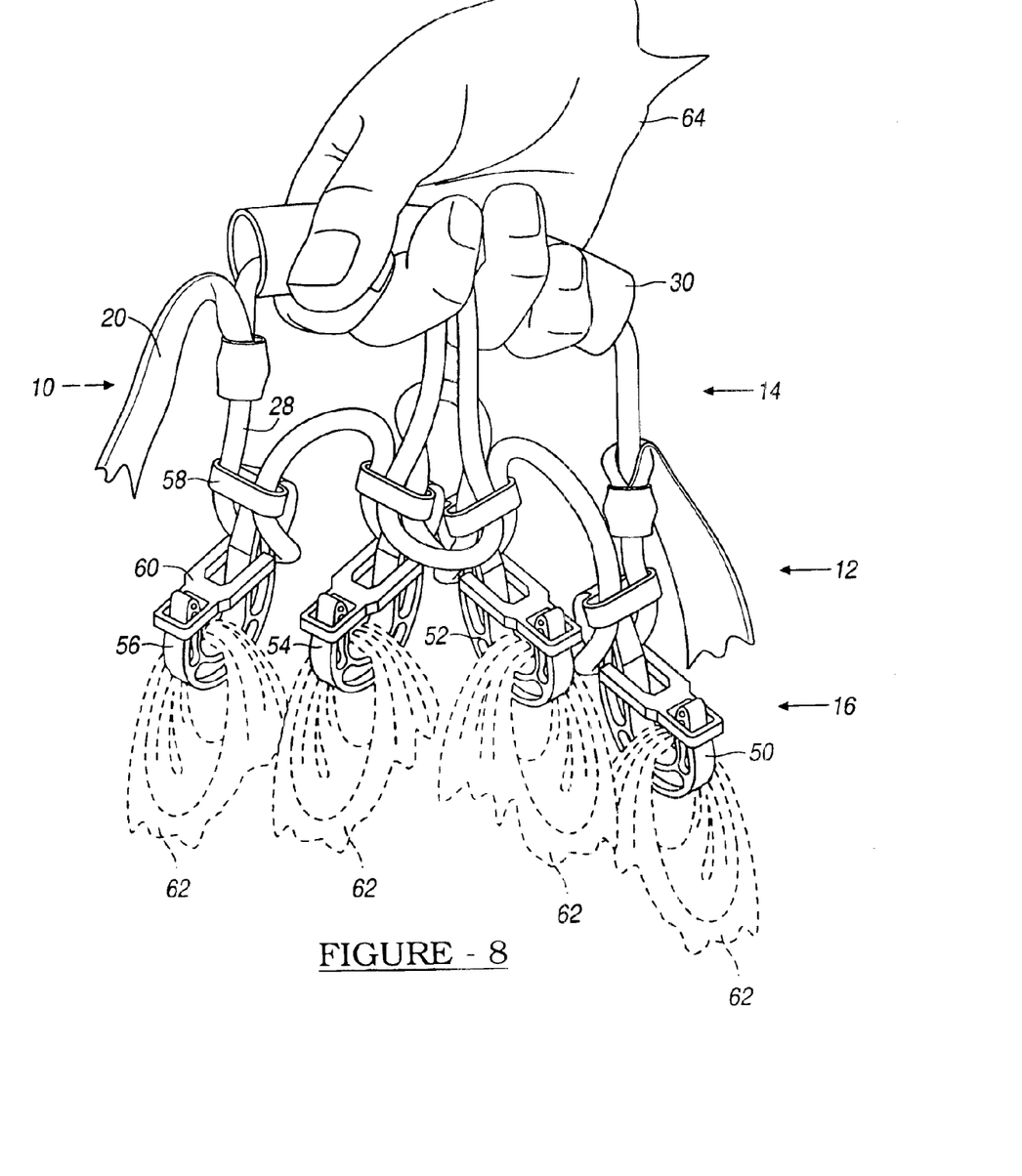
FIG. 8 is a front view of the first embodiment of the present invention wherein the apparatus is being carried by a handle according to the principles of the present invention while retaining the bags shown in dashed lines.

Shock absorption system 14 includes shock absorption cable 28 and handle 30. Shock absorption cable 28 is best shown in FIG. 2. In this embodiment, shock absorption cable 28 is made from a strong, flexible rope, such as, for example, mountain climbing rope. The elasticity of the rope facilitates shock absorption, and allows for weight distribution in cases of uneven loading of the retainer system 16. The shock absorption system 14 also includes a plurality of shock absorption loops, 32, 34, 36, 38 and 40 formed by the shock absorption cable 28 and coupled to the retainer system 16. Retaining loop 40 of the shock absorption cable 28 is coupled to both the retainer system 16 and the handle 30. The handle 30 defines a passageway 42 through which the shock absorption cable 28 passes, and further defines a set of openings 44 through which retaining loop 40 passes to further couple handle 30 to the shock absorption cable 28. The handle 30 allows the apparatus 10 for retaining bags to be carried by hand, as shown in FIG. 8. In this embodiment, handle 30 is made of recycled rubber, providing a soft grip surface which conforms to the operators hand.

The support system 12 is coupled to the shock absorption cable 28 by a cylindrical metal crimp 46 or other appropriate technique. Two cylindrical metal crimps 46 are used, one for each end of the strap 20 of the support system 12. The strap 20 from the support system 12 is placed adjacent to the shock absorption cable 28 when it is an open loop and cylindrical metal crimp 46 firmly encompasses both strap 20 and shock absorption cable 28. Next, a cylindrical polymeric sheet or heat shrink tubing 48 is placed over cylindrical metal crimp 46 such that an equal amount of heat shrink tubing 48 is on both the strap 20 of the support system 12 and the shock absorption cable 28. The heat shrink tubing 48 further includes an inner adhesive layer. The heat shrink tubing 48 undergoes a heat shrink process to firmly secure the strap 20 of the support system 12 to the shock absorption cable 28 and to cover the cylindrical metal crimp 46. Then, the ends of shock absorption cable 28 are melted together to form a closed loop. The final assembly of the heat shrink tubing 48 and cylindrical metal crimp 46 is best shown in FIG. 3, wherein the cylindrical metal crimp 46 is shown in dashed lines beneath the heat shrink tubing 48.

Referring to FIG. 2, the retainer system 16 includes a plurality of fasteners 50, 52, 54, and 56 coupled to the shock absorption cable 28 of the shock absorption system 14. Specifically, fasteners 50, 52, 54 and 56 have a loop 58 through which shock absorption cable 28 passes forming loops 32, 34, 36 and 38 respectively, of the shock absorption system 16 as shown in FIG. 3 for frictional engagement. In addition, retaining loop 40 of the shock absorption system 16 passes through fasteners 52 and 54 for additional support. Hence, the fasteners 50, 52, 54, and 56 are able to move with respect to the shock absorption cable 28. The ability of the fasteners 50, 52, 54, and 56 to move allows the apparatus 10 to self level due to uneven weight distribution among the fasteners 50, 52, 54, and 56 and also allows the fasteners 50, 52, 54, and 56 to move to absorb shocks to the apparatus 10. In this embodiment, fasteners 50, 52, 54 and 56 are of the type disclosed in U.S. Pat. No. 4,432,121 to Dupre, and are used to retain the bags. Fasteners 50, 52, 54 and 56 have a closure 60 which ensures that the bags are not accidentally dislodged from the retaining system 16. Those skilled in the art will also realize that other types of fasteners may also be used to retain the bags.

Figure 3:
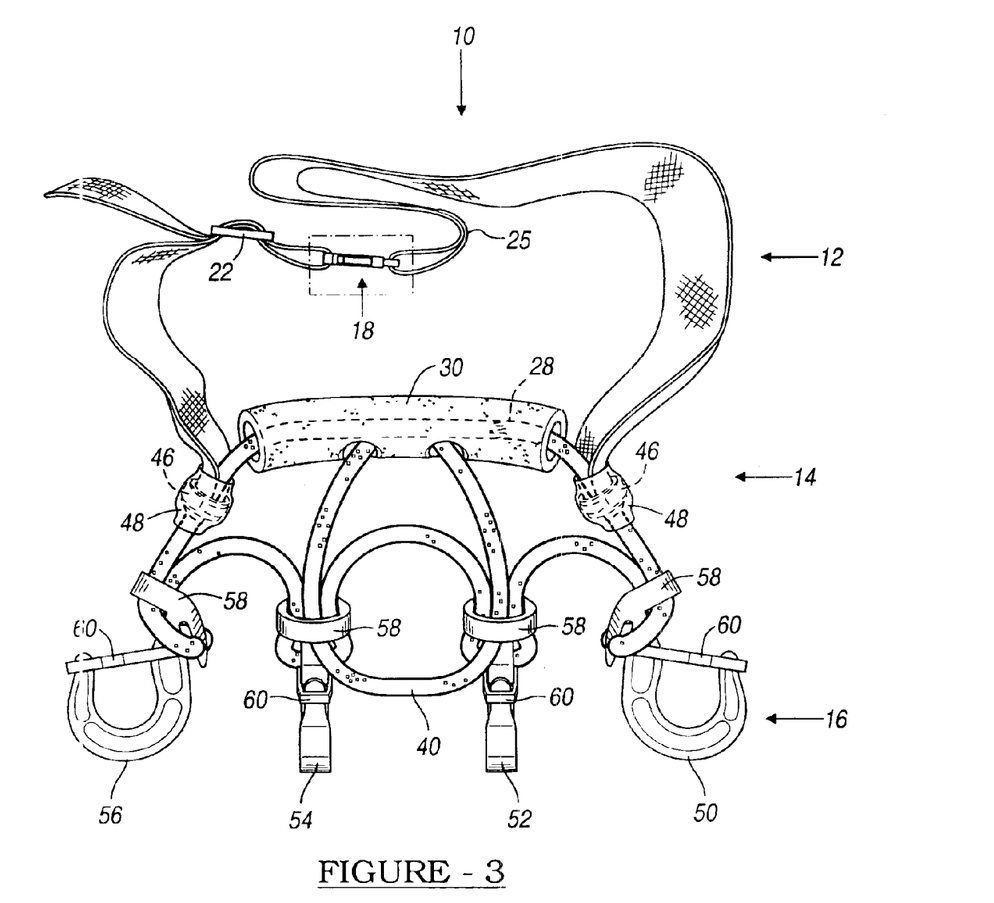
FIG. 3 is a front view of the first embodiment for an apparatus for retaining bags with hidden objects shown in dashed lines.

FIG. 3 is a perspective view of the first embodiment of the apparatus 10 for retaining bags, wherein hidden objects are shown in dashed lines. Specifically, FIG. 3 shows the final assembly of the support system 12 to the shock absorption system 14 wherein the cylindrical metal crimp 46 is visible by dashed lines. Further illustrated in FIG. 3 is passage of shock absorption cable 28 through the handle 30 via passageway 42.

Figure 4:
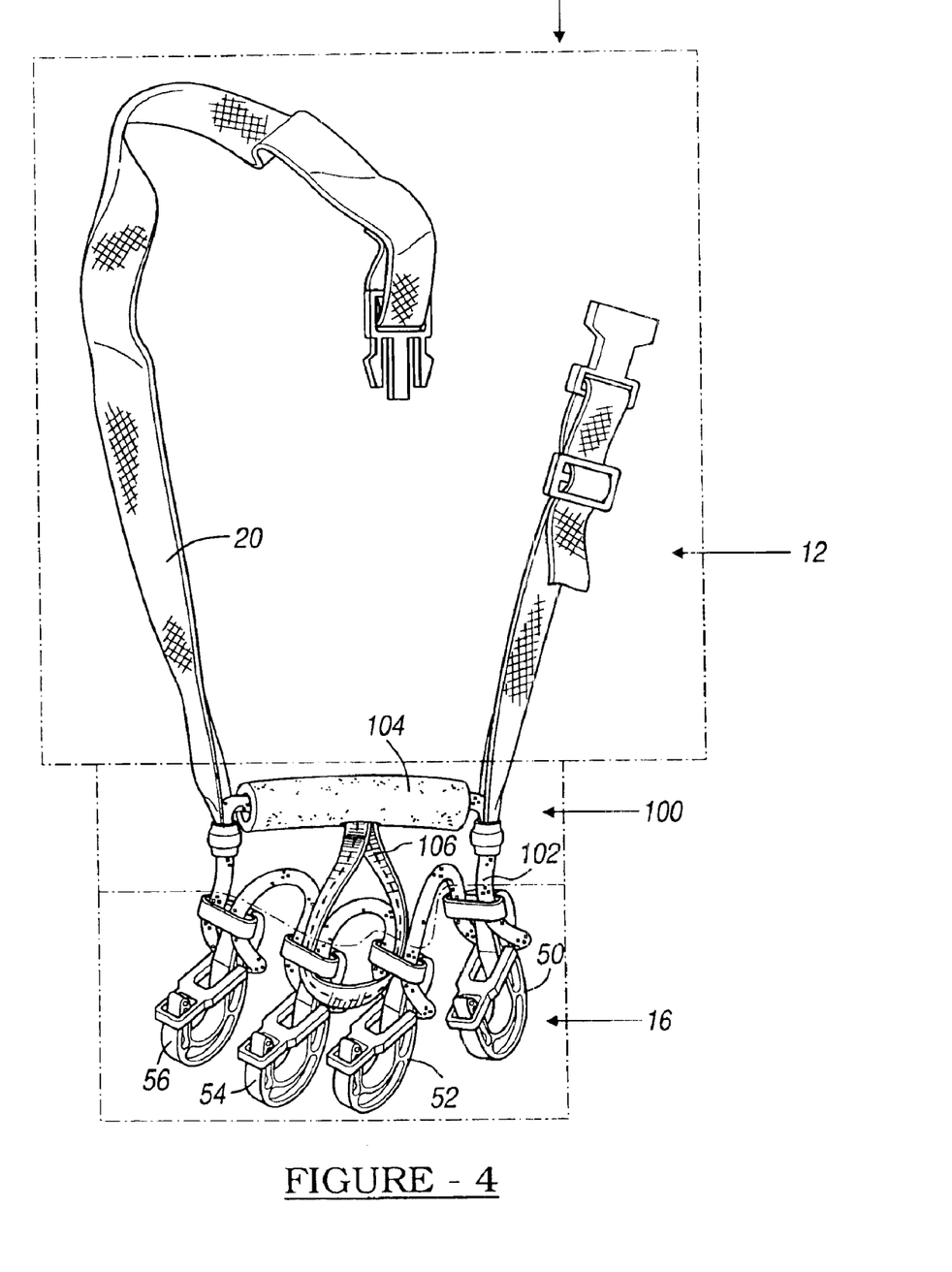
FIG. 4 is an exploded view of the alternative embodiment according to the principles of the second embodiment of the present invention.
Figure 5:
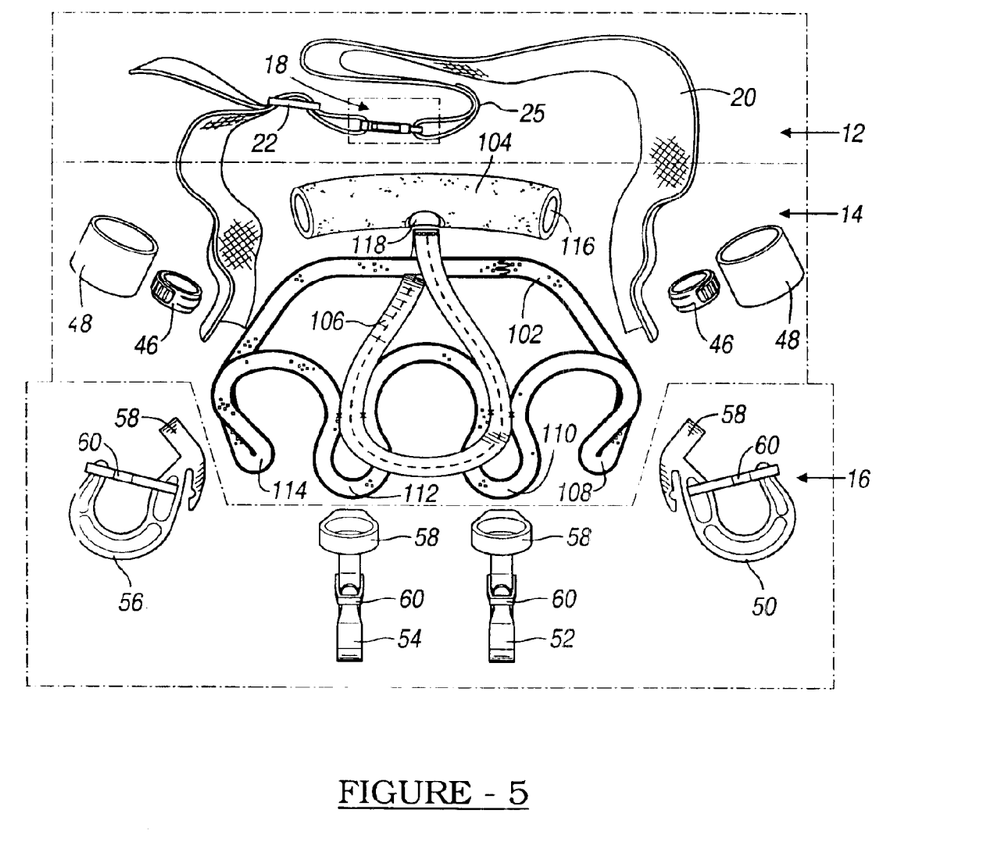
FIG. 5 is a perspective view of a second alternative embodiment according to the principles of the present invention.

Referring generally to FIGS. 4 and 5, which depict an alternative embodiment of an apparatus 10 for retaining bags, with common reference numbers utilized herein. Specifically, in this alternative embodiment, the apparatus 10 for retaining bags includes the support system 12, shock absorption system 100 and retainer system 16.

The shock absorption system 100 as shown in FIG. 4, includes shock absorption cable 102, handle 104, and retaining loop 106. Shock absorption cable 102 is best shown in FIG. 5. In this embodiment, shock absorption cable 102 is made from a strong, flexible rope, such as, for example, mountain climbing rope. The elasticity of the rope facilitates shock absorption, and allows for weight distribution in cases of uneven loading of the retainer system 16. Shock absorption system 100 also includes a plurality of loops, 108, 110, 112, and 114, formed by the shock absorption cable 102 and coupled to the retainer system 16. Retaining loop 106 of the shock absorption system 100 is coupled to the handle 104 and the retainer system 16, specifically, retaining loop 106 passes through loop 58 of fasteners 52 and 54 for additional support. In this embodiment, retaining loop 106 is made out of nylon, similar to the material used for strap 20 of the support system 12. The handle 104 has an passageway 116 through which the shock absorption cable 102 passes, and an opening 118 through which retaining loop 106 passes to further couple handle 104 to the shock absorption cable 102. The handle 104 allows the apparatus 10 for retaining bags to be carried by hand, as shown in FIG. 8. In this embodiment, handle 104 is made of recycled rubber, providing a soft grip surface which conforms to the operators hand.

The support system 12 is coupled to the shock absorption cable 102 by the same method as described in the first embodiment. The strap 20 of the support system 12 is coupled to the shock absorption system 14 by two cylindrical metal crimps 46. Likewise, the heat shrink tubing 48 is placed over cylindrical metal crimps 46 and undergoes a heat shrink process to firmly secure the strap 20 of the support system 12 to the shock absorption cable 28.

Figure 6:
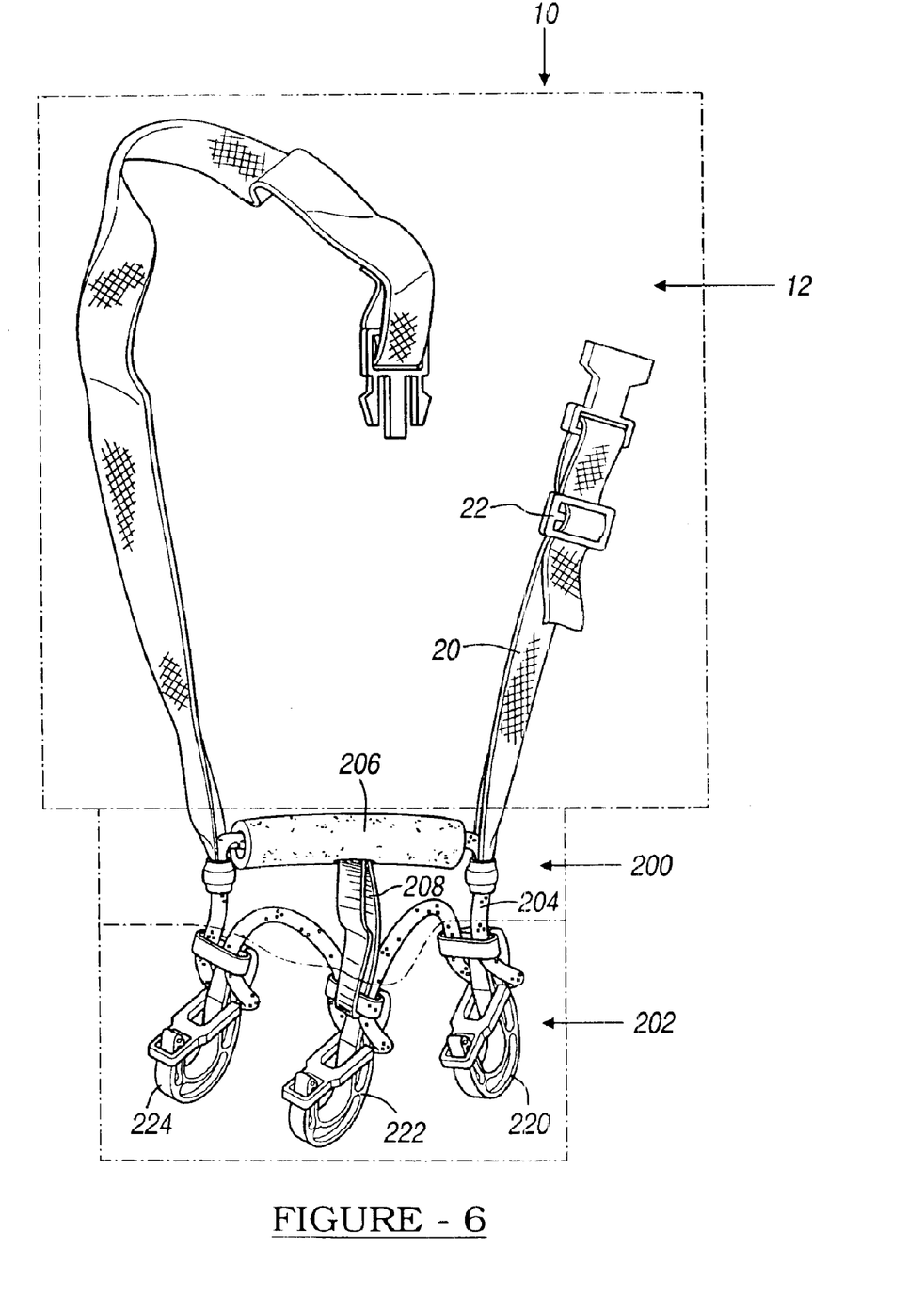
FIG. 6 is an exploded view of the second alternative embodiment for an apparatus for retaining bags according to the principles of the third embodiment of the present invention.
Figure 7:
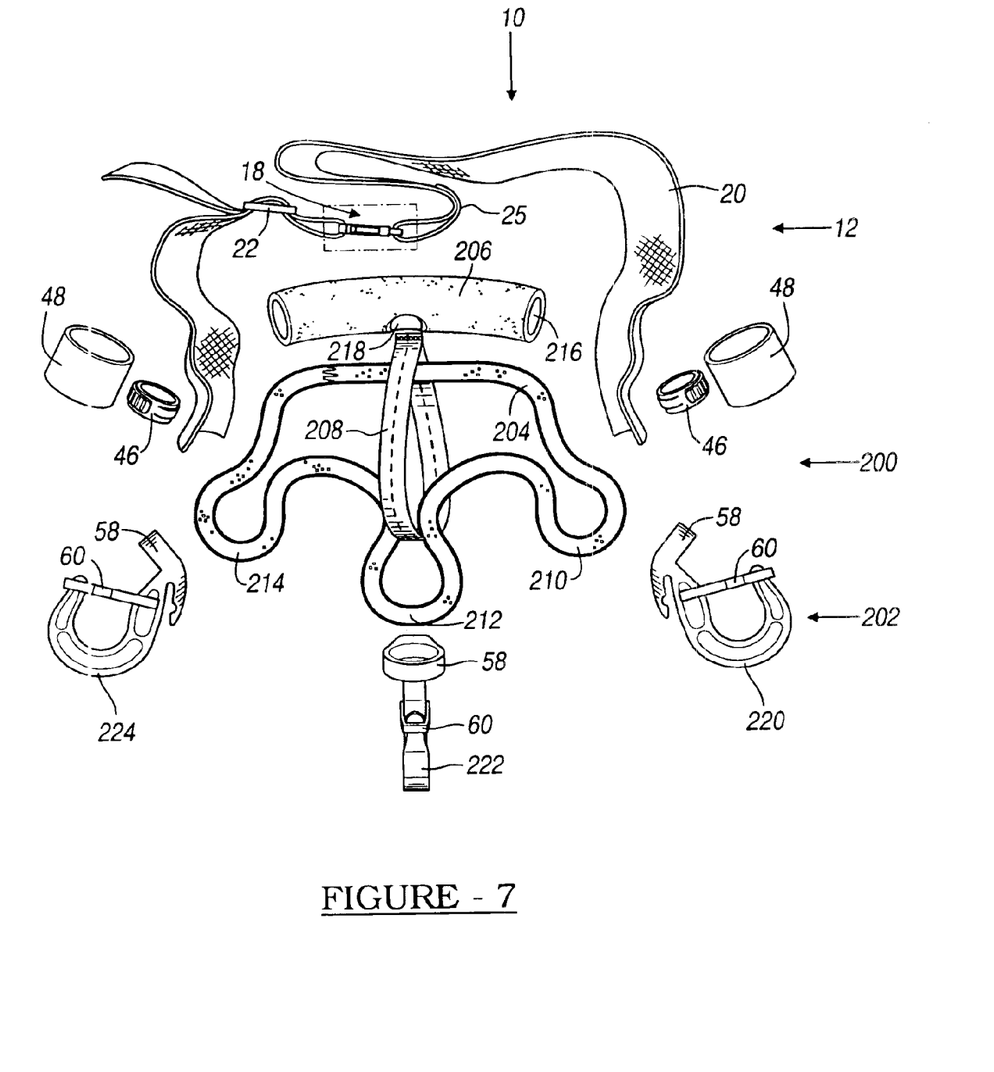
FIG. 7 is a perspective view of an alternative embodiment of an apparatus for retaining bags according to the principles of the present invention.

FIGS. 6 and 7 depict a second alternative embodiment of an apparatus 10 for retaining bags, with common reference numbers utilized herein. Specifically, in this second alternative embodiment, the apparatus 10 for retaining bags includes the support system 12, shock absorption system 200 and retainer system 202, as depicted in FIGS. 4 and 5. The difference is that the second alternative embodiment has three fasteners 220, 222 and 224 instead of the four fasteners 50, 52, 54 and 56 as described in the previous embodiment.

Referring to FIG. 6, the retainer system 202 includes three fasteners 220, 222, and 224 coupled to the shock absorption cable 204 of the shock absorption system 200. Specifically, fasteners 220, 222, and 224 have a loop 58 through which shock absorption cable 204 passes forming loops 210, 212, and 214 respectively, of the shock absorption system 200 as shown in FIG. 7. In addition, loop 208 of the shock absorption system 200 passes through fastener 222 for additional support. Hence, the fasteners 220, 222, and 224 are able to move with respect to the shock absorption cable 204. The ability of the fasteners 220, 222, and 224 to move allows the apparatus 10 to self level due to uneven weight distribution among the fasteners 220, 222, and 224 and also allows the fasteners 220, 222, and 224 to move to absorb shocks to the apparatus 10. In this embodiment, fasteners 220, 222, and 224 are of the type disclosed in patent application U.S. Pat. No. 4,432,121 to Dupre, and are used to retain the bags. Fasteners 220, 222, and 224 have a closure 60 which ensures that the bags are not accidentally dislodged from the retaining system 202. Those skilled in the art will also realize that other types of fasteners may also be used to retain the bags.

This invention is utilized to retain and transport bags. Specifically, as shown in FIG. 8, bags 62 are secured to fasteners 50, 52, 54 and 56 according to the first embodiment and transported via the handle 30. The shock absorption cable 28 distributes the load of the bags 62 and isolates the hand of the operator 64 from the movement of the bags 62 during transport, such that the hand of the operator 64 is not impacted during transportation of the bags 62.

Figure 9:
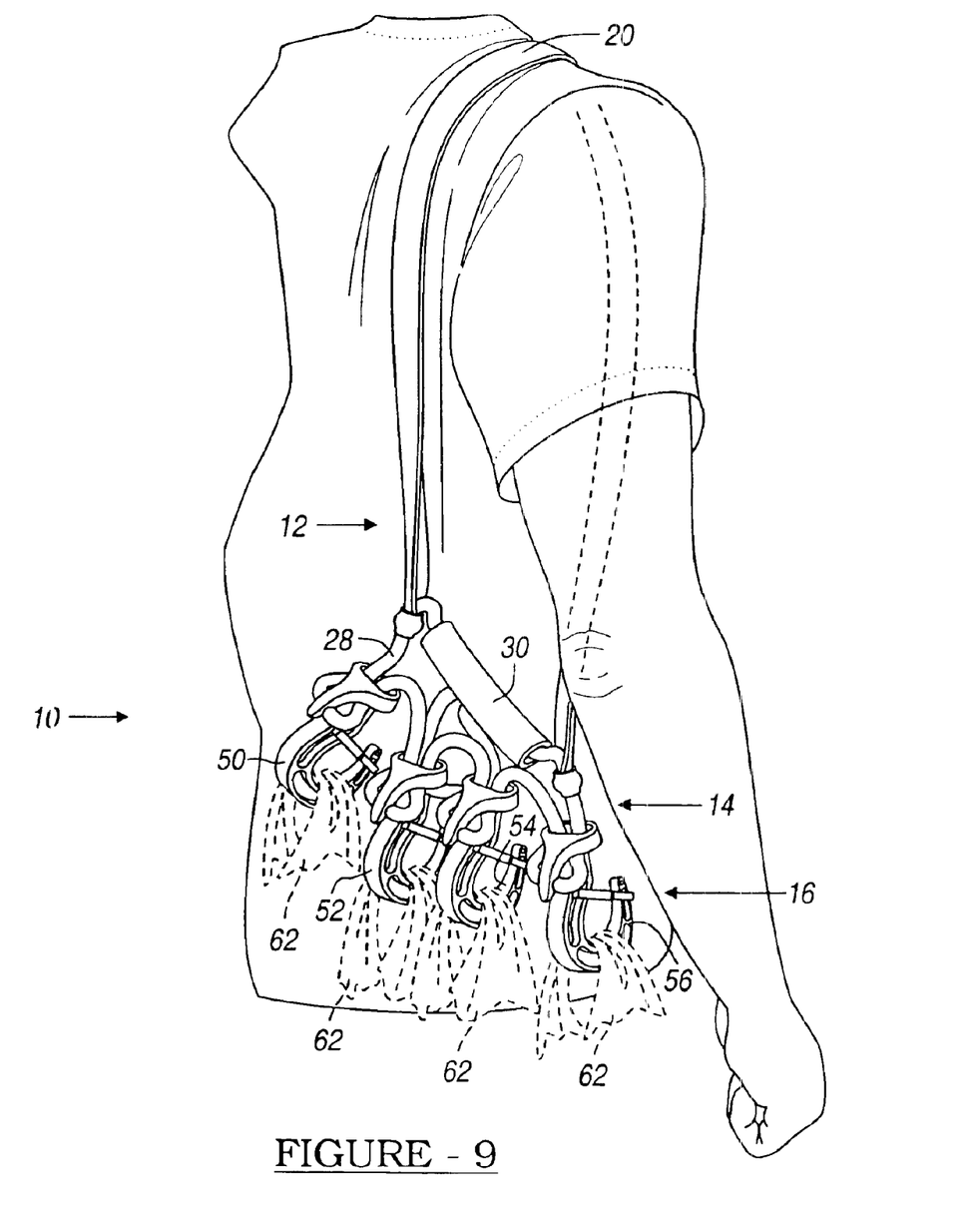
FIG. 9 is a perspective view of the first embodiment of the present invention wherein the apparatus is being carried by a strap according to the principles of the present invention while retaining the bags shown in dashed lines.

With reference to FIG. 9, the bags 62 are retained by the apparatus 10 via fasteners 50, 52, 53 and 54 in accordance with the first embodiment. In this figure, however, the bags 62 are transported via strap 20 and placed over a shoulder of the user.

Figure 10:
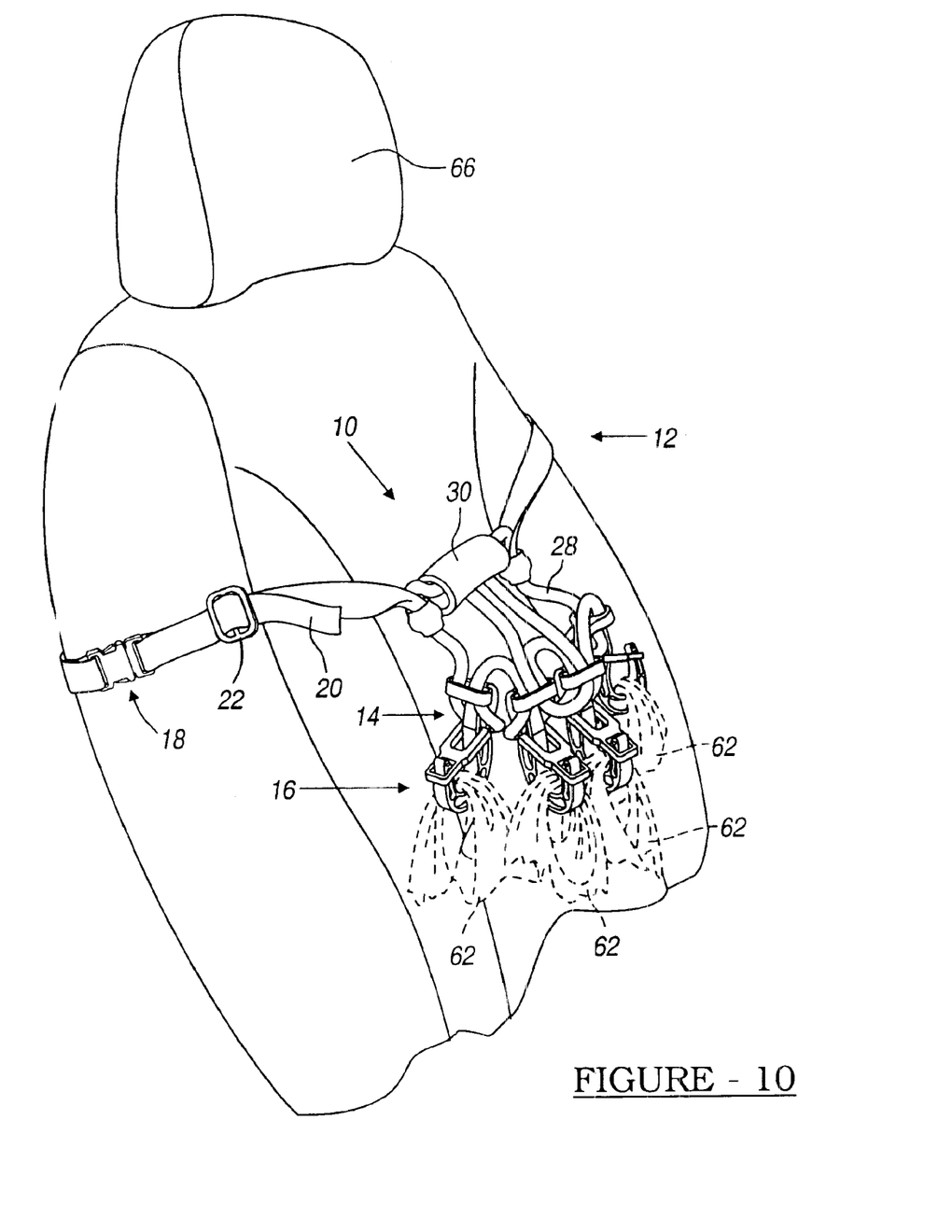
FIG. 10 is a perspective view of the first embodiment of the present invention wherein the apparatus is being utilized to secure and retain bags in a forward facing position on an automobile seat according to the principles of the present invention.

The apparatus 10 can also be used in conjunction with an automobile seat, as shown in FIG. 10. In particular, strap 20 is unbuckled via buckle assembly 18, and placed around automobile seat 66. The adjustment loop 22 is used to tighten the strap 20 to the automobile seat 66, therefore securing the bags 62 during the movement of the vehicle. By enabling the operator to secure the apparatus 10 for retaining bags around the automobile seat 66 without the removal of the bags 62 provides a convenient method for transporting bags 62 directly from the store to home. Further, the closure 60 on the fasteners 50, 52, 54 and 56 ensures that the bags 62 will not become loose during movement of the vehicle and will not spill, thus reducing driver hazards in the vehicle cabin and saving time.

Figure 11:
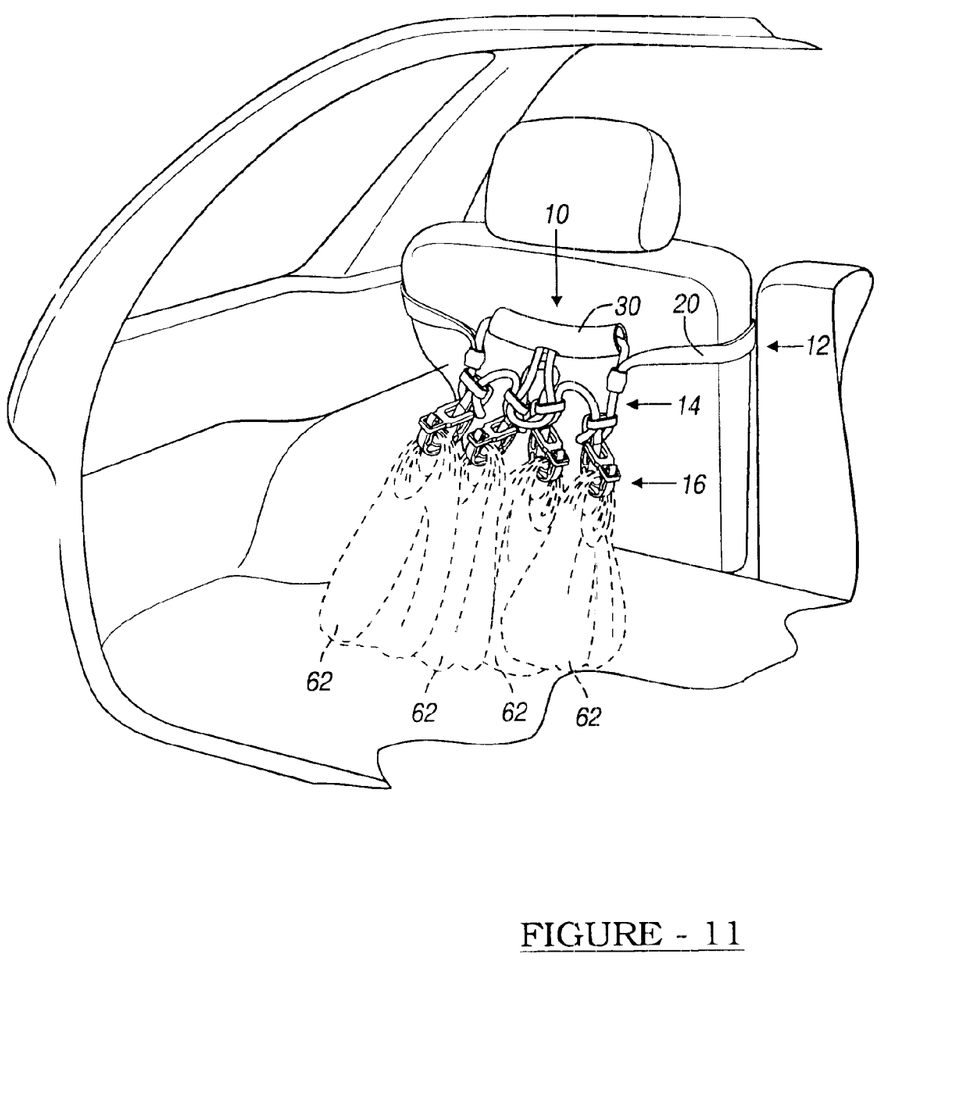
FIG. 11 is a perspective view of the first embodiment of the present invention wherein the apparatus is being utilized to secure and retain bags in a rearward facing position on an automobile seat according to the principles of the present invention.

In addition, the apparatus 10 for retaining bags can be placed around an automobile seat 66 such that the retaining system 16 is on the back of the automobile seat 66, as illustrated in FIG. 11. This transportation method is particularly useful in vehicles lacking secure cargo areas, such as, for example, sport utility vehicles. Similarly, the adjustment loop 22 is used to tighten the strap 20 to the automobile seat 66, therefore securing the bags 62 during the movement of the vehicle. By enabling the operator to secure the apparatus 10 for retaining bags around the automobile seat 66 without the removal of the bags 62 provides a convenient method for transporting bags 62 directly from the store to home. Further, the closure 60 on the fasteners 50, 52, 54 and 56 ensures that the bags 62 will not become loose during movement of the vehicle and will not spill, thus preventing spills in the vehicle cargo area and saving time.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for retaining bags, comprising: a strap operable to support or carry the bags; a retaining mechanism mechanically coupled to said strap and including at least one fastener operable to retain the bags, a shock absorption system coupled to said retaining mechanism; and wherein, said shock absorption system is configured to stabilize the bags retained by said at least one fastener during transport, wherein said retaining mechanism further includes a handle coupled to said shock absorption system.

2. The apparatus of claim 1 wherein said handle further includes a loop to further couple said handle to said shock absorption system.

3. The apparatus of claim 1 wherein said at least one fastener is a hook.

4. The apparatus of claim 1 wherein said strap is configured to fit around a vehicle seat.

5. The apparatus of claim 1 wherein said strap includes a buckle configured to adjust a length of said strap.

6. The apparatus of claim 5 wherein said strap is configured to receive an advertisement thereon.

7. An apparatus for retaining bags, comprising: a strap operable to support or carry the bags; a retaining mechanism mechanically coupled to said strap and including at least one fastener operable to retain the bags, a shock absorption system coupled to said retaining mechanism; and wherein, said shock absorption system is configured to stabilize the bags retained by said at least one fastener during transport, wherein said shock absorption system is a flexible elastic material configured as a plurality of loops.

8. An apparatus for retaining bags, comprising: a strap operable to support or carry the bags; a retaining mechanism mechanically coupled to said strap and including at least one fastener operable to retain the bags, a shock absorption system coupled to said retaining mechanism; and wherein, said shock absorption system is configured to stabilize the bags retained by said at least one fastener during transport, wherein said strap is rigidly fixed to said shock absorption system by a metal ring around said strap and said shock absorption system.

9. An apparatus for retaining bags, comprising: a strap operable to support or carry the bags; a retaining mechanism mechanically coupled to said and including at least one fastener operable to retain the bags, a shock absorption system coupled to said retaining mechanism; and wherein, said shock absorption system is configured to stabilize the bags retained by said at least one fastener during transport, wherein said metal ring is a crimped metal ring with a polymer coat.

10. An apparatus for retaining bags comprising: a strap operable to support or carry the bags; a retaining mechanism mechanically coupled to said strap and including a plurality of fasteners operable to retain the bags, a shock absorption system coupled to said retaining mechanism; and a handle connected to said retaining mechanism.

11. The apparatus of claim 10 wherein said shock absorption system is configured to stabilize the bags during transport.

12. The apparatus of claim 10 wherein said handle further includes a loop to further couple said handle to said shock absorption system.

13. The apparatus of claim 10 wherein said strap includes a buckle configured to adjust the length of said strap.

14. The apparatus of claim 10 wherein said strap is configured to receive an advertisement thereon.

15. The apparatus of claim 10 wherein said fastener is a closeable hook.

16. The apparatus of claim 10 wherein said shock absorption system is a flexible elastic material.

17. The apparatus of claim 16 wherein said shock absorption system is configured as a plurality of loops of flexible elastic material.

18. An apparatus for retaining bags comprising: a strap operable to support the bags; a retaining mechanism coupled to said strap; a plurality of fasteners coupled to said retaining mechanism and operable to retain the bags; a handle mechanically coupled to said retaining mechanism operable to support the bags; and wherein said handle and said strap enable the transportation of said retaining mechanism.

19. The apparatus of claim 18 wherein said fastener is a closeable hook.

20. The apparatus of claim 18 wherein said self leveling system is a flexible elastic material.

21. The apparatus of claim 18 wherein said strap is adaptable to fit around a vehicle seat.

22. The apparatus of claim 18 wherein said strap is rigidly fixed to said self leveling system by a metal ring around said strap and said self leveling system.

23. The apparatus of claim 18 wherein said plurality of fasteners can slide on said retaining mechanism.

24. The apparatus of claim 18 wherein said retaining mechanism further includes a self leveling system.

25. The apparatus of claim 24 wherein said self leveling system is configured to stabilize the bags during transport.

26. The apparatus of claim 18 wherein said handle further includes a loop to further couple said handle to said self leveling system.

27. The apparatus of claim 26 wherein said loop is elastic.

28. The apparatus of claim 26 wherein said loop is inelastic.

29. A method for transporting bags, comprising: attaching at least one bag to at least one fastener on a retaining mechanism; adjusting a strap coupled to said retaining mechanism to fit around a shoulder; transporting said retaining mechanism to a vehicle by use of said strap; and unbuckling said strap to attach said strap and retaining mechanism with said at least one bag around a seat in said vehicle; wherein said retaining mechanism secures said at least one bag during movement of said vehicle.

30. The method of claim 29 further comprising: transporting said retaining mechanism to a vehicle by a handle coupled to said retaining mechanism.

31. The method of claim 29 further comprising: using a shock absorption system to distribute the weight of the bags and stabilize the bags during transport.

* * * * *